July 10, 1934.  B. T. ANDREN  1,966,401
RIVET
Filed May 25, 1931

INVENTOR.
Birger T. Andren
BY
ATTORNEY.

Patented July 10, 1934

1,966,401

UNITED STATES PATENT OFFICE 1,966,401

RIVET

Birger T. Andren, Milwaukee, Wis., assignor to A. O. Smith Corporation, Milwaukee, Wis., a corporation of New York Application May 25, 1931, Serial No. 539,714

8 Claims. (Cl. 85—37)

The invention relates generally to rivets and more particularly to rivet heads.

Heretofore, it has been common practice in the manufacture of rivets to make the under face of the head and the wall of the shank or stem meet in a substantially 90° angle. This sharp angle results from the use of a shank forming die which has an inside shoulder that is substantially a right angle.

In the process of die pressing rivets, the blanks are expanded slightly when the heads are being formed to give a shank of the desired diameter. In order to expand the blank, the metal is flowed into the lower die member across the right angled inside shoulder of the stationary die member.

A microscopic examination of rivets manufactured with the angle between the head and shank substantially a right angle reveals that the metal is disrupted or torn at the junction of the head and shank. This tear may be described as a circumferential fissure. As a result, such rivets will not withstand the strains that their dimensions indicate they should carry. Further, when rivets of this type fail, it is usually because the head pulls off.

From the foregoing it will be evident that a rivet with a 90° angle between the head and shank does not give the strength for a predetermined size of rivet that may be obtained from a rivet made in accordance with a method which does not result in the disrupting of the metal at the junction of the head and shank.

Further, when a rivet constructed with a sharp angle between the head and shank is utilized for riveting plates or the like, the under surface of the rivet head, when placed in position, bears on the plates to be riveted substantially throughout the whole of its under surface. In order to perform a riveting operation, the head is distorted with the result that the plate or member being riveted is pressed downwardly along the line defining the rivet hole and they may be torn or weakened.

When a rivet having a 90° meeting angle between the under face of the head and shank is utilized for riveting thin sheets, the distortion of the head expands the metal defining the rivet hole and often tears it. Further, the pressure between the head and plate is not uniform throughout. Therefore, rivets constructed with a right angle between the head and stem are not suitable for connecting thin sheets of metal.

When riveting with the old type of head, the shank or stem of the rivet may be upset and expanded when subjected to a riveting pressure except at the point of junction with the head. As a result, a neck is formed adjacent the head which is smaller in diameter than the expanded portion of the stem. Therefore when rivets of the old type are utilized, their weakest point is the neck near the head which remains substantially the diameter of the rivet stem when manufactured.

A study of rivets of the old type when riveted reveals that the stem tends toward and generally takes the shape of a barrel. As the shank or stem is pressed into a barrel shape, the head is distorted giving the under face a conical shape. When the shape of the head has been changed in this manner, it does not bear on the article riveted with a uniform pressure throughout their contacting faces.

The object of the present invention generally stated is to provide a rivet that is strong and easily applied and that may be readily and economically manufactured.

A more specific object of the invention is to provide for making riveted joints in which the pressure between the rivet head and the member riveted is substantially uniform throughout the contacting areas.

A further object of the invention is to provide for making a riveted joint in which the plane of contact between the rivet head and the member riveted lies substantially in the plane of the surface of the latter.

Another object of the invention is to provide for forming, during the process of making a rivet, a circumferential strain hardened fillet at the junction of the head and shank of the rivet to increase its strength.

It is also an object of the invention to provide a rivet head which facilitates the flow of metal during the process of riveting to expand the shank near the head.

For a fuller understanding of the nature and objects of the invention, reference may be had to the following detailed description taken in conjunction with the accompanying drawing in which.

Figure 1:
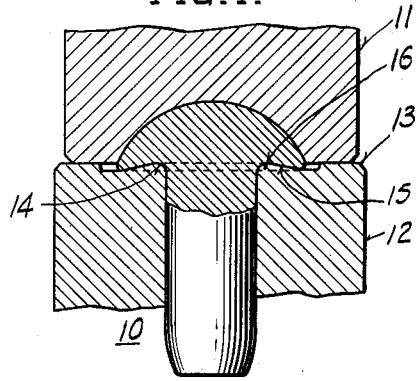
Figure 1 is a cross-sectional view of a die suitable for constructing rivets in accordance with my invention.
Figure 2:
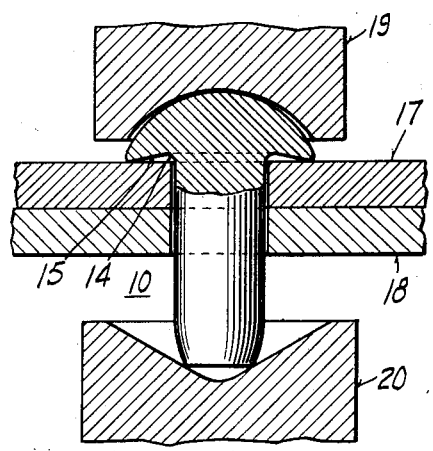
Fig. 2 is a view partly in section and partly in side elevation of a rivet constructed in accordance with this invention showing it mounted in a rivet hole in plates to be riveted and showing dies suitable for performing a riveting operation.

Referring to the drawing and Fig. 1 in particular, the rivet 10 which is made from some suitable malleable metal is shown as having been formed by two die members 11 and 12. The movable die member 11 is provided with a concave face which conforms to the size and shape of the rivet head that it is desired to manufacture. The stationary or shank die member 12 is designed to form a shank or stem of the proper length and diameter.

The general practice in operating dies of this type is to mount the die member 11 for movement relative to the stationary die member 12. In the embodiment illustrated, an annular rim 13 is provided on the stationary die member 12 for receiving the upper die member 11. The rim is disposed near the edge of die members so that the head of the rivet will not be completely confined during the die pressing operation but may flow outwardly. Therefore in the finished rivet, the metal at the rim of the head will present a curved face, the curvature of which will depend upon the natural flow of the metal when subjected to an upsetting pressure.

As shown, the rivet 10 has a circumferential fillet 14 at the junction of the head and shank. The under face 15 of the rivet head slopes downwardly from the top of the fillet 14 to the rim of the head. In this manner the rivet is formed with a concave under face.

In order to give the rivet head the proper shape, the stationary die member 12 is constructed with a circumferential ridge 16 extending around the shank or stem opening. The inner wall of the ridge 16 is curved to conform to the shape it is desired to give to the fillet 14, while the outer portion slopes downwardly as it extends outwardly. The extent of the downwardly sloping portion will depend on the diameter of the rivet head to be formed.

In the process of forming a rivet 10 with this type of die, when pressure is applied to expand the blank to form a shank or stem of the desired diameter, the metal is caused to conform to the curved inner wall of the ridge 16. The result of this movement of metal under pressure around the curved portion of the lower die member 12 effects a coining operation which improves the characteristics of the metal at the junction of the head and stem and produces a strain hardened fillet.

The provision of a strain hardened fillet 14 greatly increases the strength of the rivet head. Therefore for a given size of rivet a head constructed in accordance with this invention may be made flatter and of a greater diameter than in the manufacture of rivets which are not provided with fillets. This increases the area of the under surface 15 of the rivet head providing for a large area of contact between it and the article to be riveted.

The volume of metal in a section of a rivet head taken transversely of the axis of the rivet will vary directly as the cube of the diameter. Therefore in the manufacture of rivets in accordance with this invention, since the rivet heads have a large diameter as compared with the diameter of the stem, the volume of metal flowed for a predetermined die stroke will be great, which facilitates the forming of the stem of the proper diameter in the stationary die member 12.

In order to explain the advantageous features of the rivet 10, an explanation of the steps of the riveting process and a description of the shape of the rivet after it has been riveted to unite plates 17 and 18 will be given. The size of the rivet, of course, will depend on the conditions to be met.

When a rivet 10 is placed in the aligned rivet holes in the plates 17 and 18, only the outer rim will engage the upper plate 17. In order to facilitate the insertion of the rivet and to improve the final connection of the plates by means of the rivet, the rivet holes are made slightly larger than the shank or stem of the rivet 10.

In order to perform the riveting operation, two die members 19 and 20 are provided. Both die members 19 and 20 may be disposed for movement but the usual practice is to provide a stationary die member for supporting the head. The stationary die member 19 is provided with a concave face, the curvature of which is slightly flatter than the curvature of the rivet head.

As shown, the lower die 20 has a concave face which is substantially frusto-conical in shape. The function of this die member is to upset the metal in the shank and to center the rivet during the riveting operation. The inclination of the concave face of the lower die will depend on the slope required to effect the centering of the rivet.

When pressure is applied to perform a riveting operation, it will be applied directly to the center of the rivet head. The rivet will be forced tightly into the rivet hole and the head flattened to engage the plates throughout its entire surface. The movable die member 20 will upset the shank of the rivet forming a riveted head 21 and flowing metal along the shank to expand it. In such manner the metal is flowed to set the head, fill the rivet hole, and form a riveted head 21.

The coined or strain hardened fillet engages the upper rim defining the rivet hole. Since the fillet is usually harder than the member being riveted, it will compress the latter and effect a coining operation as the rivet head forms a seat for itself.

Figure 3:
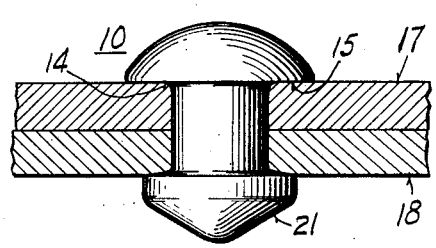
Fig. 3 is a view in side elevation of a rivet constructed in accordance with this invention applied to unite plates, the plates being cut away to show the shape of the rivet.

As will be observed by reference to Fig. 3, when a riveting operation with the type of rivet disclosed in this application has been completed, the shank or stem uniting the flattened head with the riveted head 21 is substantially cylindrical in shape. This cylindrical shape is obtained because the shank at the point of junction with the head may expand. The explanation of the manner in which the shank will expand adjacent the head will be given hereinafter in connection with the description of Fig. 9.

When the riveting operation has been completed, the under surface of the rivet head will engage the upper plate 17 throughout the entire area of the former and the plane of their contact will lie substantially in the plane of the upper surface of the plate. As a result, the pressure between the under surface of the rivet head and the plate will be substantially uniform throughout.

It will be readily understood that a rivet of this type, having a large flat head which engages the plate or members to be riveted with a uniform pressure throughout its entire under surface, is highly desirable for uniting thin plates. The plate engaged by the rivet head is distorted very little during the riveting process and the upper rim defining the rivet hole is coined, thus increasing its strength. Further, the large head helps to support or stiffen the plate 17.

Figure 4:
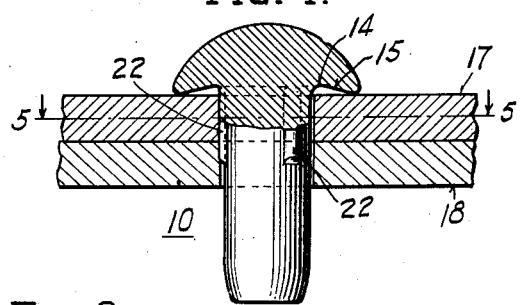
Fig. 4 is a cross-sectional view of a modification of the rivet showing longitudinal ribs formed on the shank.
Figure 5:
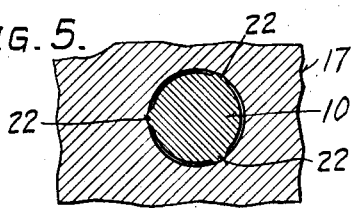
Fig. 5 is a cross-sectional view taken along the line 5—5 of Fig. 4.

Under certain conditions, it is desirable to have a rivet which engages the walls of the rivet hole in order to retain it in position once it has been inserted in the rivet hole until it has been riveted. In the modification shown in Fig. 4, a plurality of longitudinal ribs 22 are provided. As shown, these ribs extend from the head downwardly along the shank of the rivet. Any number of ribs may be provided but in this particular embodiment of the invention only three ribs 22 are formed on the shank.

The advantages obtained in die pressing the head described hereinbefore are also obtained in forming a rivet with ribs or the like. The movement of the greater volume of metal in the rivet head during the die pressing operation results in a complete filling of the rib depressions provided in the lower die.

Figure 8:
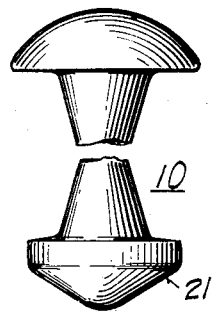
Fig. 8 is a view in side elevation of a rivet constructed in accordance with this invention showing the shape it takes when it is subjected to a disrupting strain.
Figure 6:
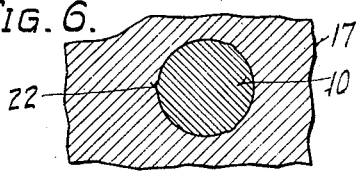
Fig. 6 is a cross-section of the modified rivet shown in Fig. 4 after a riveting operation has been performed.
Figure 7:
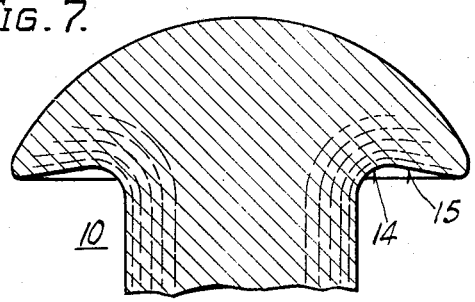
Fig. 7 is an enlarged cross-sectional view of a rivet head illustrating the lines along which the metal is strengthened by coining when a rivet is constructed in accordance with my invention.

A microscopic examination of rivet heads constructed in accordance with this invention reveals that the metal in the fillet 14 is not disrupted but that it is compressed along the lines shown diagrammatically in Fig. 7. The result is that the rivet is stronger at the junction of the head and shank than at any point in the shank. Therefore, when the rivet is subjected to a disrupting strain, it will fail in the shank, as shown in Fig. 8. As will be observed, the shank has been drawn into what may be described as two conic frustums.

Therefore a rivet has been provided which will carry strains equal to the strength of the shank and which will not, during the process of riveting, weaken the members being riveted.

Figure 9:
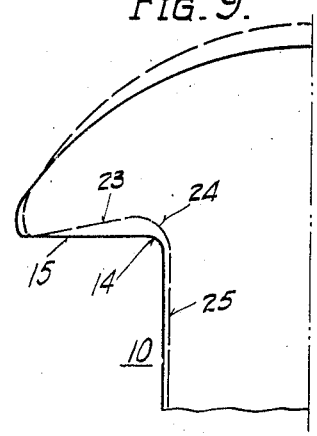
Fig. 9 is an enlarged diagram illustrating the movements of the walls of the rivet during a riveting operation.

Referring to Fig. 9, the dotted line, sections of which are designated by the numerals 23, 24, and 25, represents portions of the under face of the rivet head, the wall of the fillet and the wall of the stem respectively, before the rivet has been subjected to a riveting operation. During the riveting operation, the section 23 moves downwardly to a substantially horizontal position. The lower portion of the section 24 is forced outwardly with the section 25 of the stem, taking up the position shown in full lines.

The lower end of the curved line 24 is straightened to form a part of the wall of the stem while the section 25 is merely pressed outwardly. The curvature of the fillet section in this particular instance is changed, the radius being considerably shortened.

In the preceding paragraph, a general description of the change in shape of the rivet 10 has been given, but it is to be understood that the change in shape will depend on the riveting conditions, and the distortion of the rivet head in many instances may not conform exactly to that shown in the diagram.

The composition of the metal selected for making rivets will depend on the conditions to be met in the riveting operations and the strength required. However, the head described will not limit the selection of metals.

Since numerous changes may be made in the above described construction and different embodiments of the invention may be made without departing from the spirit and scope thereof, it is intended that all matters contained in the above description or shown in the accompanying drawing shall be interpreted as illustrative and not in a limiting sense.

I claim as my invention:

1. A rivet comprising, in combination, a shank, a malleable head integral with the shank, the under face of the head being sloped downwardly and outwardly from the shank to facilitate reforming of the head and flattening of the same during a riveting operation, and a fillet extending between the head and the shank.

2. A rivet comprising, in combination, a stem, a malleable head provided on the stem, the malleable head having a concave under face which facilitates the reshaping of the rivet head during a riveting operation whereby the under surface of the head conforms to the surface of the member riveted.

3. A rivet comprising, in combination, a stem, a head provided on the stem, a fillet extending between the head and the stem, the under face of the head merging into the top of the fillet and sloping downwardly toward the periphery, forming a rivet head having a concave under face, the head being malleable to permit the flowing of the metal during a riveting operation, said concave under face and fillet being capable of distortion to permit the expansion of the stem at the junction with the head to maintain a substantially cylindrical stem when the latter has been upset by a riveting operation.

4. A rivet comprising, in combination, a stem, a malleable head having a concave under face provided on the stem, a strain hardened fillet extending between the head and stem, said fillet and concave under face of the head being disposed to permit the rolling out of the under portion of the fillet to expand the shank during the distortion of the head and the upsetting of the metal of the stem during a riveting operation, whereby when the riveting operation has been completed, the head presents an under surface conforming to the surface of the member riveted and the stem is of a substantially cylindrical shape and of greater diameter than when formed.

5. A rivet comprising, in combination, a stem, a malleable head provided on the stem, a fillet extending between the head and stem, said head and fillet being disposed to permit an outward movement of the periphery of the head and the lower portion of the fillet during a riveting operation to expand the stem, said outward movement of the lower portion of the fillet giving the stem a substantially cylindrical shape after it has been upset and expanded during the riveting operation.

6. In a rivet for uniting members, in combination, a shank, a head having a depending rim provided on the shank, the under surface of the head being an inclined frusto-conical surface extending from the rim to the shank, a strain hardened fillet extending between the head and shank to strengthen the rivet, the head being malleable to permit reshaping to move the inclined surface downwardly to engage substantially throughout its area the member to be riveted when a riveting operation has been performed, thereby establishing a contact between the under surface of the rivet head and the member to be riveted in a plane which is substantially the plane of said member.

7. A rivet comprising, in combination, a stem, a malleable head having a concave face provided on the stem, and projections provided on the stem adjacent the head for retaining the rivet in position after it is driven until the head is flattened by a riveting operation.

8. A rivet comprising, in combination, a stem, a malleable head having a concave face provided on the stem, a strain hardened fillet extending between the stem and concave face of the head, and projections provided on the stem adjacent the head for engaging in a rivet hole to retain the rivet in position prior to the riveting operation.

BIRGER T. ANDREN.